UNITED STATES PATENT OFFICE.

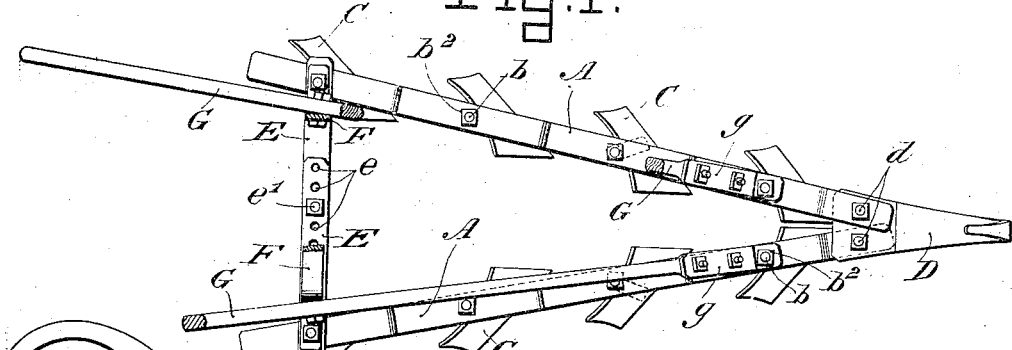
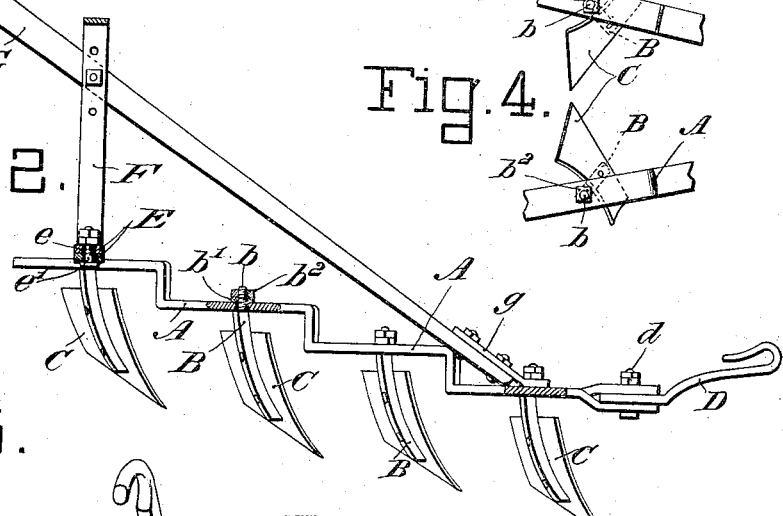
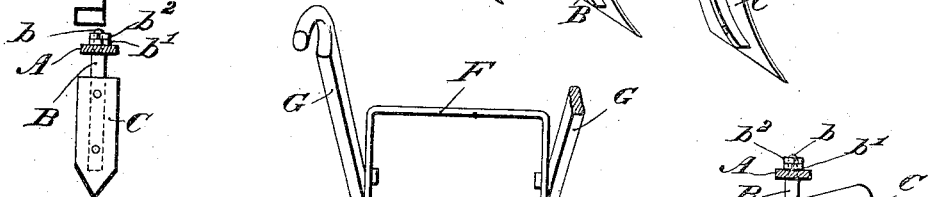
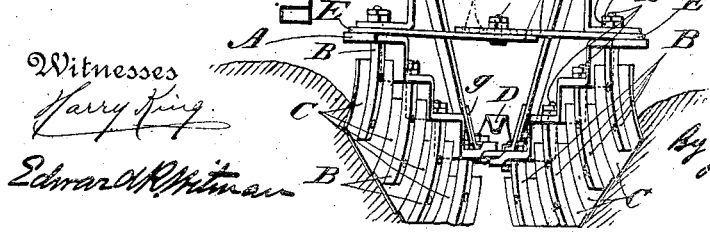

ANDREW J. COMPTON, OF CEDAR GROVE, NORTH CAROLINA.

CULTIVATOR.

No. 903,676.  Specification of Letters Patent.  Patented Nov. 10, 1908.

Application filed March 23, 1908. Serial No. 422,750.

*To all whom it may concern:*

Be it known that I, ANDREW J. COMPTON, a citizen of the United States, residing at Cedar Grove, in the county of Orange and State of North Carolina, have invented certain new and useful Improvements in Cultivators; and I do hereby declare the following to be a full, clear, and exact description of the invention, such as will enable others skilled in the art to which it appertains to make and use the same.

The implement constituting the subject of this invention is a cultivator for working bedded land by means of scrapes.

It is particularly adapted for the cultivation of tobacco, the successful growing of which requires frequent tillage to expose fresh surfaces and in such manner as to protect the roots of the plants and leave the land in condition to shed water, so as to avoid sobbing of the ground by rain which often destroys the fertilizer and drowns the plants.

The implement is likewise adapted for cultivation of various other plants which are grown in ridges or hilled rows.

The invention will hereinafter be first fully described by reference to the accompanying drawings, which form a part of this specification, and then more particularly pointed out in the claims at the end of this specification.

In said drawings, wherein corresponding parts in the different figures are designated by the same reference symbols; Figure 1 is a plan view of an implement embodying my invention. Fig. 2 is a central longitudinal section, showing one-half of the cultivator-frame and attached blades or scrapes in side elevation. Fig. 3 is a back view or rear elevation. Fig. 4 is a plan view of a fragment of the cultivator-frame, showing the blades or scrapes set to throw the earth away from the plants, as distinguished from the position of the blades represented in the preceding figures where they are shown set to throw the earth up the hills or toward the opposite rows of plants between which the cultivator is running. Figs. 5 and 6 are detail views of modified forms of cultivator blades.

The cultivator-frame, which is substantially triangular in form, comprises two side-bars A, A, arranged oppositely inclined or oblique to the center line of draft so as to diverge rearwardly. As shown more clearly in Figs. 2 and 3, each side-bar A is in the form of a series of steps, ascending rearwardly, and to the several steps are respectively attached the shanks B of the cultivator blades or scrapes C. By this construction, the front cultivator blades or scrapes run down in the center of the furrow or between the beds of plants while the others gradually ascend the hills or beds at opposite sides. At the same time, the frame as a whole and the individual cultivator blades maintain a correct position.

The scrapes or blades are so secured that they can be axially adjusted and can be set to work either outward or inward, that is to throw the soil up the hills and toward the opposite rows of plants or away from the hills toward the bottom of the intervening trench or furrow. For this purpose, the shanks B of the blades are shown having reduced threaded upper ends $b$ which pass up through apertures in the strap-iron side-bars A and are secured rigidly by nuts $b^1$ and jam-nuts $b^2$. By loosening the nuts, an axial adjustment can be readily and quickly given to each standard or shank, according to the direction or angle at which the scrapes are to be operated. Other suitable means for attaching the shanks or standards, so as to provide for axial adjustment, may of course be substituted.

Figs. 1, 2 and 3 show the blades or scrapes set to throw the soil oppositely outward and upward toward the bedded rows of plants; while Fig. 4 shows the blades set to throw the soil away from the plants and toward the center of the furrow. At different stages in the cultivation of tobacco and other plants, the implement would be operated both ways.

While the implement is primarily designed for cultivation by means of scrapes, yet other forms of cultivator blades may be substituted. For example, if deeper tillage is desired, narrow hoe-blades such as shown in Fig. 5 may be substituted, or, if desired, the front blades of the implement may be according to Fig. 5, while the other blades may consist of scrapes such as shown in Figs. 1 to 4 inclusive.

Fig. 6 shows a longer scrape which may be advantageously used on the back ends of the side-bars A to carry the earth up to the plants.

The front converging ends of the frame-bars A are attached to the short tongue or link D, or they may be joined to any suitable clevis-head, to which the horse or team is hitched in the ordinary manner. As the cultivator-frame is intended to be adjusted to suit different widths of rows, the side-bars A are pivotally-attached to the link D by means of pivot bolts $d$; or they may be so attached by other means. One bar A is shown lapping under the link D and the other lapping over it, so as to avoid interference between the front ends of the side bars when they are moved laterally for adjusting the width of the frame. For the purpose of adjustment, the rear ends of the side bars A are shown connected by a spreader or extensible member consisting of flat bars E having overlapping portions and provided with a plurality of bolt-holes $e$ by means of which they can be fastened at various positions with a bolt $e^1$.

An arch or yoke member F spans the hind part of the cultivator frame, the legs of said arch being fastened to and mounted upon the rear ends of the side bars A. This arch consists preferably of strap-iron, the flexibility of which is sufficient to permit distending of the arch when the cultivator frame is widened. The handle-bars G are bolted or fastened to the sides of said arch and their front ends are attached by bracket-irons $g$ to the front portions of the side-beams $a$. The bolts which fasten the front and rear cultivator blades are or may be respectively utilized for attachment of the bracket-irons $g$ and the feet of the yoke F.

It will be seen that the implement will cultivate the bedded plants by scraping off the inclined surfaces of the hills at a slight depth and substantially even from the center of the furrow to the top portions of the ridges; so as to permit frequent cultivation to break the soil and give fresh surfaces, but without liability of injury to the roots of the plants; while the ground is also left in condition to shed the water, in case of rain.

In practice, I have found that tobacco cultivated by this implement is of sturdier growth and better quality, and worth a higher price, than when worked by ordinary methods of cultivation.

Having thus described my invention, what I claim as new and desire to secure by Letters Patent of the United States is:

1. A cultivator for working bedded land having opposite obliquely-arranged and stepped sets of cultivator-scrapes which diverge and at the same time ascend rearwardly, and means whereby the scrapes individually can be axially-adjusted and arranged to throw the soil down toward the center of the furrow or up toward the opposite rows of plants between which the cultivator is working.

2. In a cultivator for working bedded land, a cultivator-frame which comprises opposite side-bars obliquely arranged to diverge rearwardly and each bar made in the form of a series of steps ascending rearwardly and adapted for attachment of cultivator-blades or scrapes to the successive steps thereof.

3. In a cultivator for working bedded land, a cultivator-frame comprising opposite side-bars arranged obliquely and stepped to diverge and at the same time ascend rearwardly, and cultivator-blades or scrapes the shanks of which are attached to the successive steps of said bars, said shanks being axially-adjustable to permit setting the blades or scrapes so as to operate at different angles.

4. In a cultivator, a frame comprising opposite side-bars arranged obliquely and converging toward the front, means pivotally-connecting the front ends of said bars, an extensible member joining the rear ends of said bars, a flexible yoke or arch mounted on the rear portions of said bars and spanning said frame, and inclined handle-bars fastened to the sides of said arch and having their forward ends attached to the front portions of said side-bars.

In testimony whereof I affix my signature, in presence of two witnesses.

ANDREW J. COMPTON.

Witnesses:
B. C. PATTON,
A. O. ELLIS.